United States Patent [19]
Liang

[11] Patent Number: 5,873,439
[45] Date of Patent: Feb. 23, 1999

[54] SUPPORTING DEVICE FOR A WHEELED SUITCASE

[76] Inventor: Sung-Ming Liang, No. 21, Lane 169, Fu-Shan St., Chang-Hua City, Taiwan

[21] Appl. No.: 808,633

[22] Filed: Feb. 28, 1997

[51] Int. Cl.$^6$ .................................................. A45C 5/14
[52] U.S. Cl. ............................ 190/18 A; 190/39; 16/34; 280/43.1
[58] Field of Search ..................... 16/29, 34; 190/18 A; 280/37, 43.1

[56] References Cited

U.S. PATENT DOCUMENTS

| | | | |
|---|---|---|---|
| 3,842,953 | 10/1974 | Royet | 190/18 A |
| 4,087,102 | 5/1978 | Sprague | 190/18 A X |
| 4,397,062 | 8/1983 | Huang | 190/18 A X |
| 4,575,109 | 3/1986 | Cowdery | 190/18 A X |
| 4,588,055 | 5/1986 | Chen | 190/18 A |
| 5,519,919 | 5/1996 | Lee | 16/115 |
| 5,568,848 | 10/1996 | Liang | 190/18 A |

FOREIGN PATENT DOCUMENTS

2751184  8/1978  Germany .................................... 16/34

*Primary Examiner*—Sue A. Weaver
*Attorney, Agent, or Firm*—Sughrue, Mion, Zinn, Macpeak & Seas, PLLC

[57] ABSTRACT

A supporting device for a wheeled suitcase includes a positioning member to be mounted on the back wall of the suitcase, and a leg member which has an upper end connected pivotally to the positioning member and a bottom wheel. The leg member is turnable outward from the back wall of the suitcase to be in an operative inclining position and inward to be in a position folded over the back wall. A locking member can lock the leg member in the operative inclining position. The locking member is operable for releasing the leg member.

6 Claims, 11 Drawing Sheets

SUPPORTING DEVICE FOR A WHEELED SUITCASE

BACKGROUND OF THE INVENTION

1. Field of the Invention

This invention relates to a supporting device for a wheeled suitcase, more particularly to a supporting device which cooperates with a bottom wheel for supporting the suitcase in an operative inclined position.

2. Description of the Related Art

Figure 1:
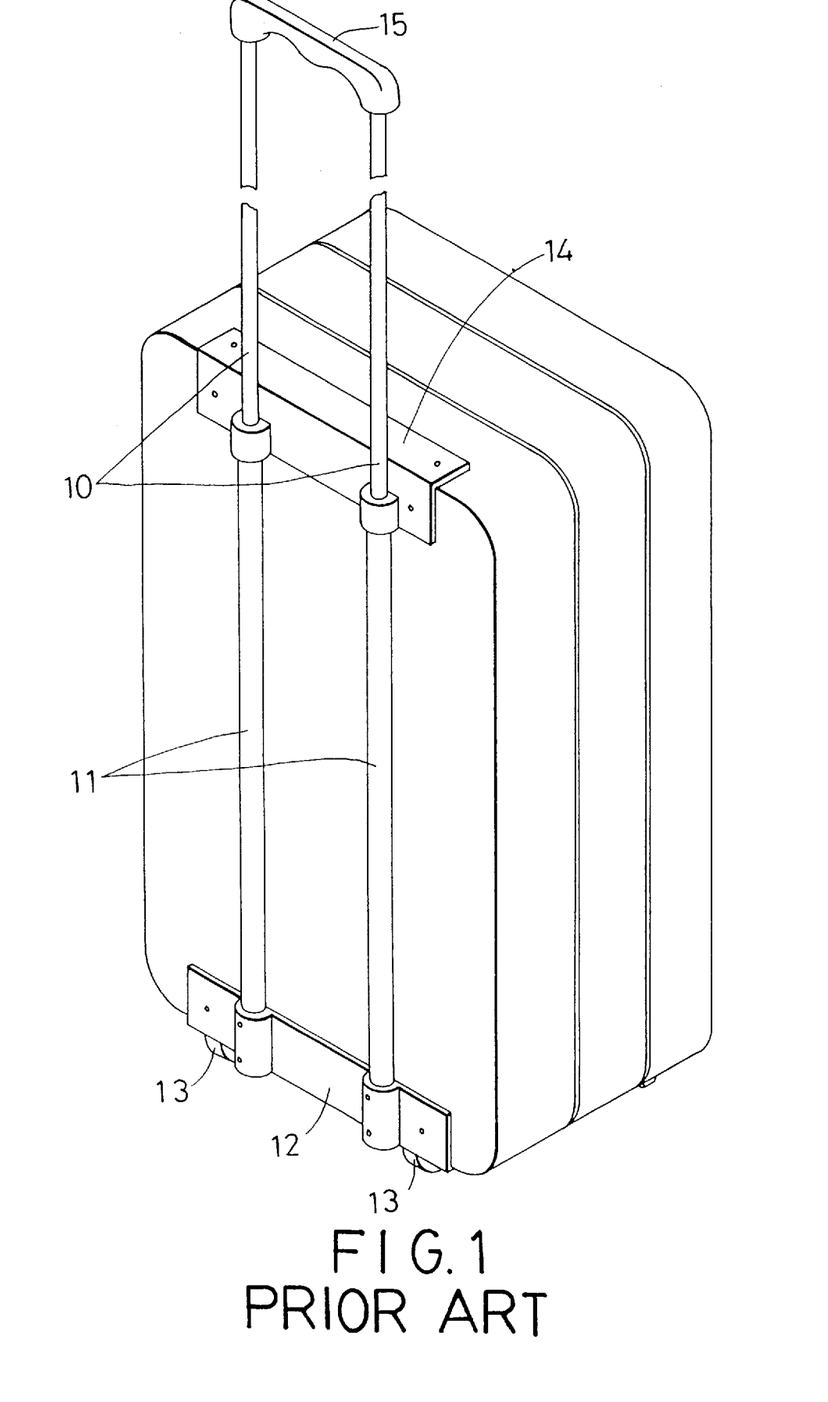
FIG. 1 is a perspective view of a conventional wheeled suitcase.
Figure 2:
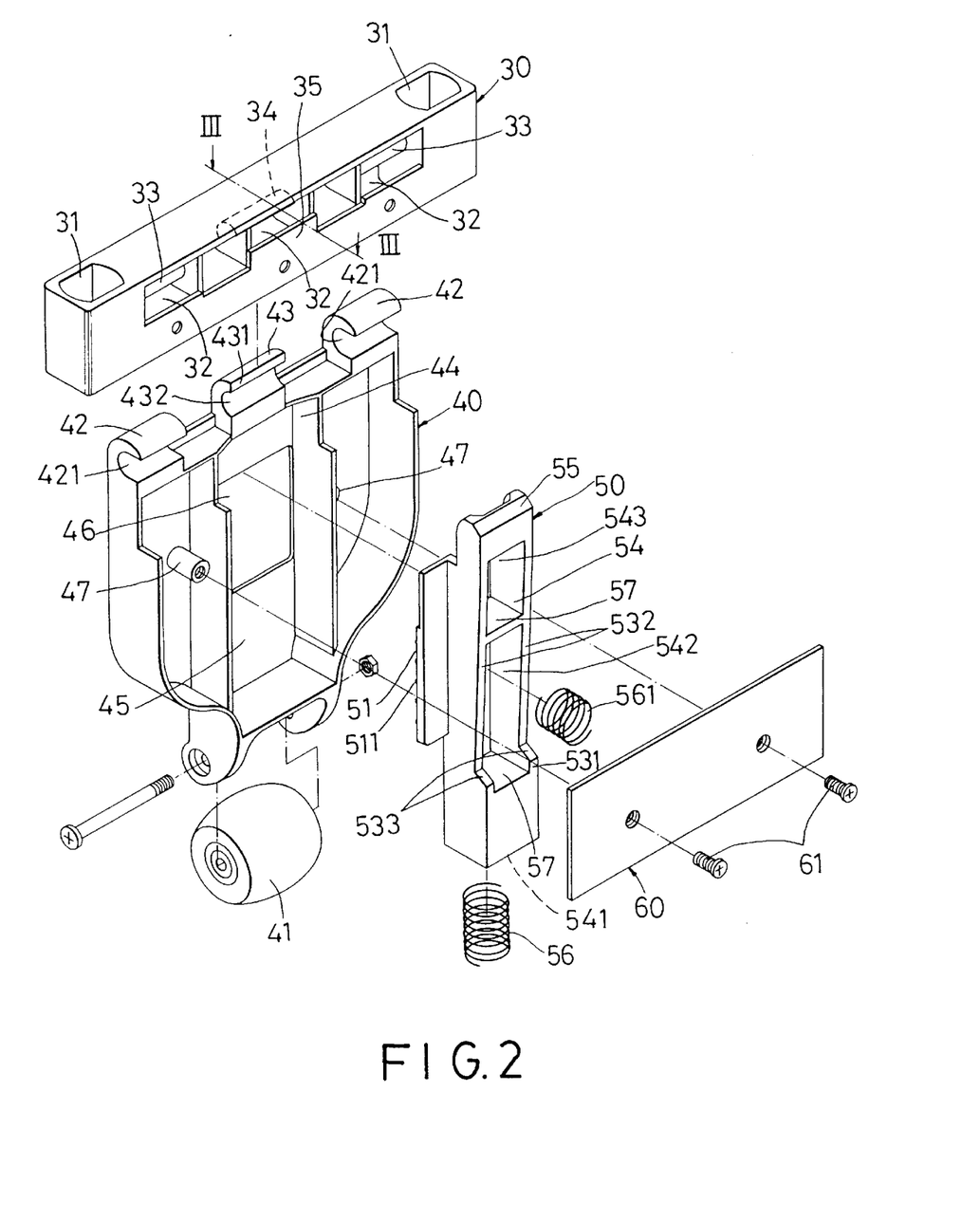
FIG. 2 is an exploded view of a preferred embodiment of a supporting device according to the present invention.

Referring to FIG. 1, a conventional wheeled suitcase is shown to comprise a pair of longitudinally extending storage tubes 11 which have top ends and bottom ends, a U-shaped handle 15 which has two parallel arm portions 10 inserted slidingly into the storage tubes 11 from the top ends, top and bottom plates 14, 12 to mount the arm portions 10 to the top and bottom ends of the storage tubes 11, and roller wheels 13 which are mounted on the bottom end of the bottom plate 12 for movement of the suitcase.

For moving the suitcase, one must grasp and pull upwardly the handle 15 to extend the arm portions 10, and tilt the suitcase. When stopping temporarily, the user may release the handle 15 and place the suitcase upright on the ground. To resume movement, the suitcase must be inclined or tilted again prior to the movement of the suitcase by pulling the handle 15. The need to tilt the suitcase each time before the suitcase is to be moved from its upright resting position causes inconvenience to the user.

SUMMARY OF THE INVENTION

The main object of the present invention is to provide a wheeled suitcase with a supporting device by which the suitcase can be placed in a tilted or inclined stand-by position.

According to this invention, a supporting device is provided for a wheeled suitcase which has a suitcase body with a back wall. The supporting device includes a positioning member which is mounted on the back wall of the suitcase body and which has a stop member and a pivot member, and a leg member which has an upper end mounted pivotally to the pivot member and which is turnable outwardly to an operative inclining position relative to the back wall and inward so as to be folded over the back wall. The leg member has a bottom wheel and a receiving space. A locking member is slidably received in the receiving space and has a top engaging end biased upward to be wedged between the stop member and the upper end of the leg member so as to prevent the leg member from turning when the leg member is in the operative inclining position. The locking member is operable to be moved downward to disengage the top engaging end from the stop member and the upper end.

BRIEF DESCRIPTION OF THIS DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 5:
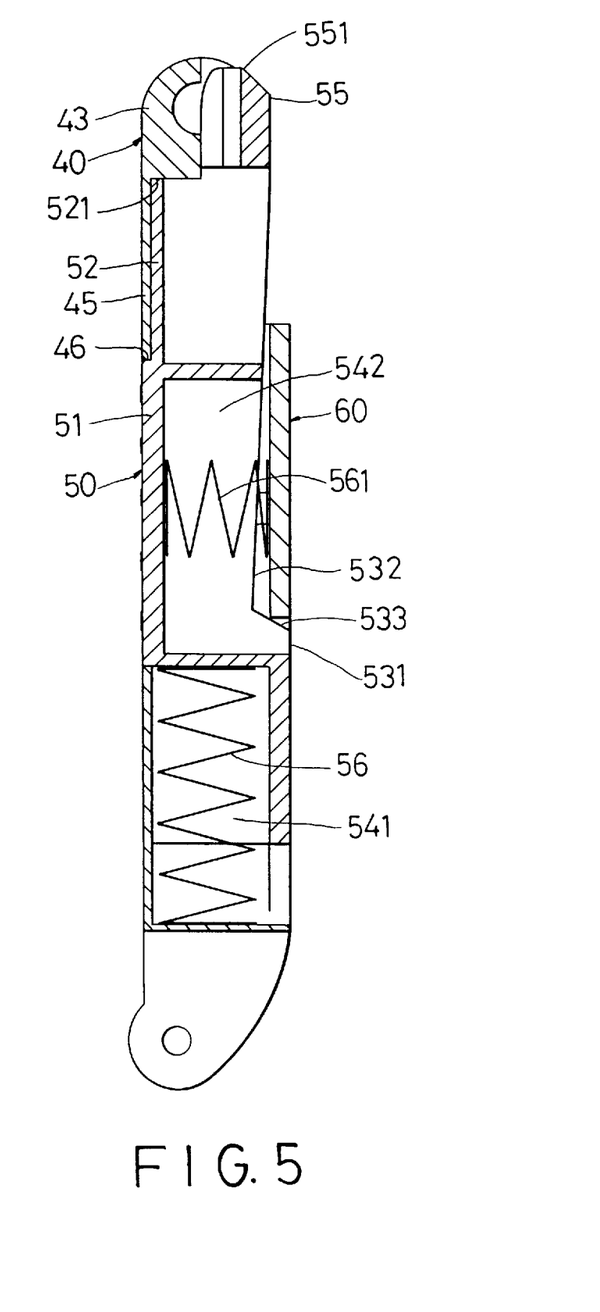
FIG. 5 is a longitudinal sectional view of the embodiment of FIG. 4 without a positioning member.
Figure 6:
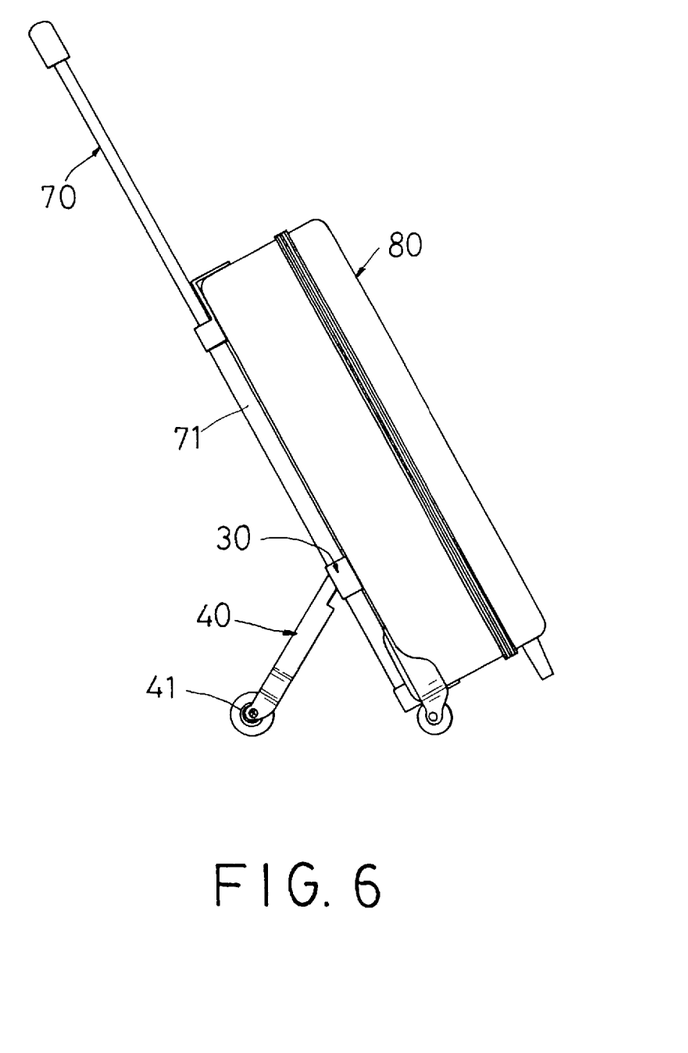
FIG. 6 is a schematic view illustrating the supporting device when mounted on a wheeled suitcase.

Referring to FIGS. 2, 3, 4 and 5, a preferred embodiment of the supporting device according to the present invention is shown to comprise a positioning member 30, a leg member 40 and a locking member 50. With reference to FIG. 6, the positioning member 30 is sleeve mounted on two storage or holding tubes 71 of a handle 70 of the wheeled suitcase 80. The leg member 40 has an upper end connected pivotally to the positioning member 30. The locking member 50 is slidably received in a receiving space 44 of the leg member 40.

Figure 3:
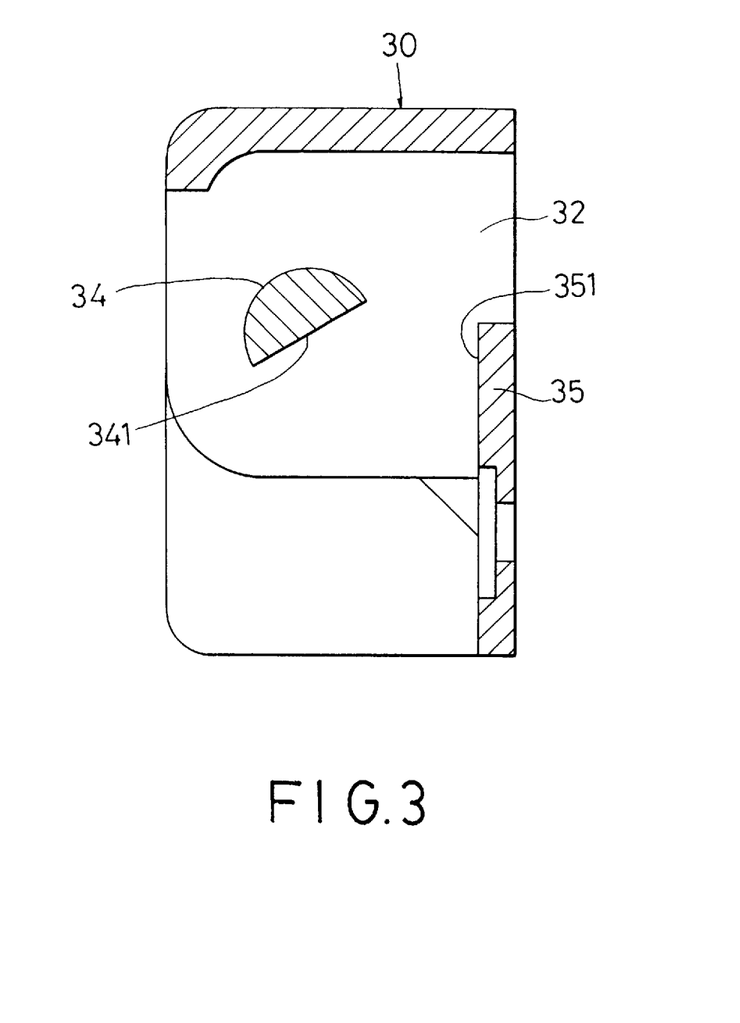
FIG. 3 is sectional view of the preferred embodiment, taken along line III—III in FIG. 2.
Figure 4:
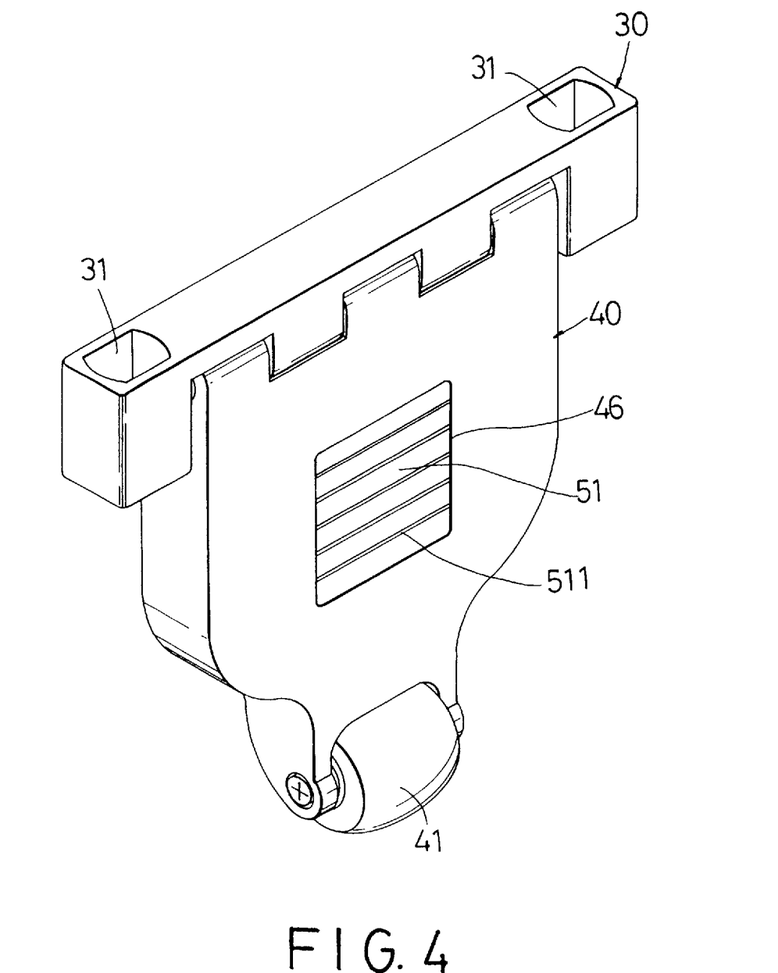
FIG. 4 is a perspective view of the embodiment of FIG. 2.

As best shown in FIG. 3, the positioning member 30 has a generally rectangular shape and an open bottom. Two vertically extending holes 31 are formed respectively in two sides of the positioning member 30 for sleeving on the holding tubes 71. The positioning member 30 is formed with three receiving spaces 32. Two side pivot members 33 and a medial pivot member 34 are provided respectively in the receiving spaces 32. The medial pivot member 34 has a semi-circular cross-section and a first diametral planar face 341 which inclines about 70° relative to a vertical plane. A stop member 35 is provided in the positioning member 30 adjacent to the medial pivot member 34 and has an abutment surface 351 substantially parallel to the back wall of the suitcase.

The leg member 40 has a bottom wheel 41 and an upper end which is provided with two side hook members 42 and a medial hook member 43. The receiving space 44 is provided between the upper end and the bottom wheel 41. The hook members 42, 43 have respectively curved grooves 421, 432 to receive turnably the pivot members 33, 34. The curved groove 432 has a semi-circular cross-section and opens at a second diametral planar face 431 of the medial hook member 43. The leg member 40 has a base wall 45 at one side of the receiving space 44, and a cover plate 60 which is positioned at the other side of the receiving space 44 to oppose the base wall 45. The base wall 45 has a press button hole 46 and two screw sleeves 47 formed therein.

Figure 8:
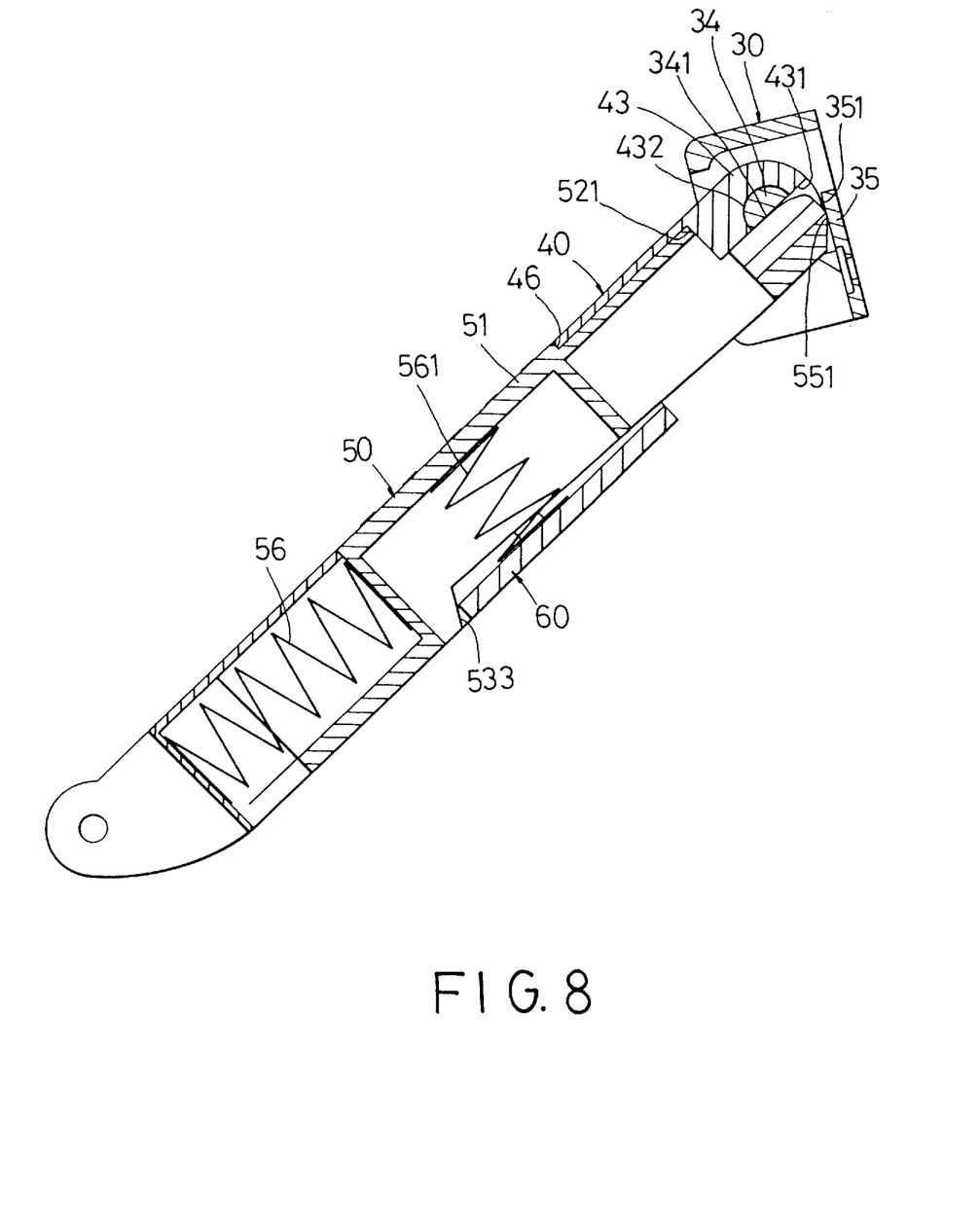
FIG. 8 is a sectional view illustrating the supporting device in an operative inclining position.

The locking member 50 has a button part 51 which projects into the press button hole 46 and which is formed with a plurality of knurls 511. Referring to FIG. 8, the locking member 50 has a top engaging end 55 which is biased upward to engage the stop member 35 and the medial hook member 43. A longitudinal groove 54 is formed in the locking member 50. Upper and lower partition plates 57 divide the longitudinal groove 54 of the leg member 40 into upper, medial and lower compartments 543, 542 and 541. A spring 56 is mounted longitudinally in the lower compartment 541. Another spring 561 is mounted transversely in the medial compartment 542. The locking member 50 further has a lower face 531 which is flush with the cover plate 60 of the leg member 40, two edge faces 532 which are indented, and two inclined shoulders 533.

Referring again to FIGS. 2, 4 and 5, in assembly, the springs 56, 561 are loaded in the lower and medial compartments 541, 542. The locking member 50 is placed in the receiving space 44 of the leg member 40, with the button part 51 projecting into the press button hole 46. Then, the cover plate 60 is screwed to the base wall 45 via two screws 61 which threadedly couple the cover plate 60 and the screw sleeves 47. After assembly, the top edge 521 of a wall 52 of the locking member 50 abuts a bottom side of the hook member 43 while the inclined shoulders 533 abut the lower edge of the cover plate 60, as best shown in FIG. 5. Finally, the hook members 42, 43 are respectively hung from the pivot members 33, 34.

Figure 7:
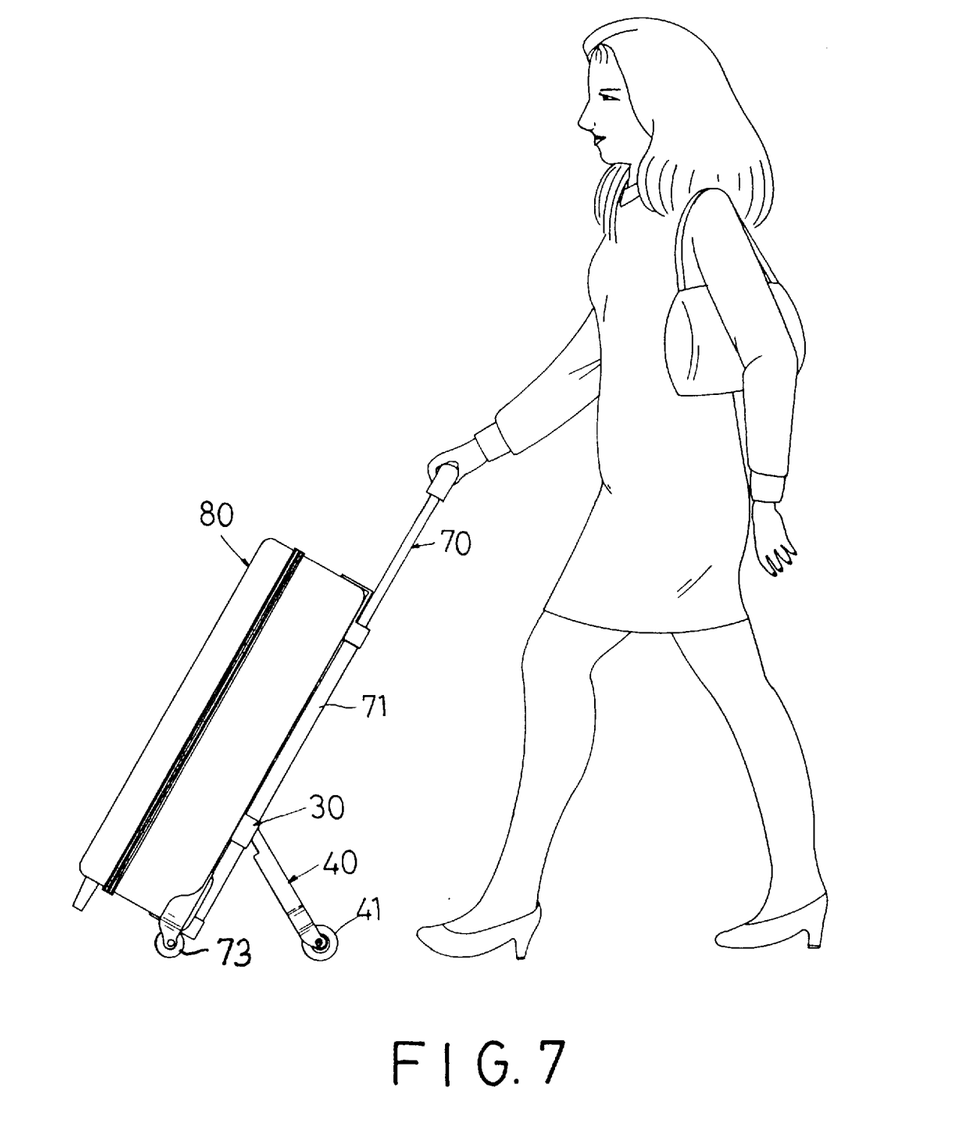
FIG. 7 is a schematic view illustrating the suitcase of FIG. 6 when moved.

Referring to FIGS. 7 and 8, when the leg member 40 is in an operative inclining position, that is the leg member 40 is turned outwardly relative to the back wall of the suitcase, the hook members 42, 43 turn about the corresponding pivot members 33, 34. When the first and second diametral planar faces 341, 431 are aligned along a common plane, the locking member 50 moves upwardly by the biasing force of the spring 56 so that the top engaging end 55 is wedged between the stop member 35 and the diametral planar faces 341, 431. The abutment surface 551 of the top engaging end 55 tightly abuts the abutment surface 351 of the stop member 35. The upward movement of the top engaging end 55 is limited when the top edges 521 and the shoulders 533 contact the medial hook member 43 and the lower edge of the cover plate 60, respectively. In this situation, the button part 51 is urged to extend into the press button hole 46 by the biasing force of the spring 561. Thus, the leg member 40 is locked in the inclining position by the locking member 50. In this state, since three wheels 41, 73 of the suitcase are rolling on the ground, the suitcase can be pushed or pulled easily.

Referring to FIG. 6, when the user stops temporarily, the suitcase can be placed in a tilted stand-by position so that the user can simply pull or push the suitcase to resume walking.

Figure 9:
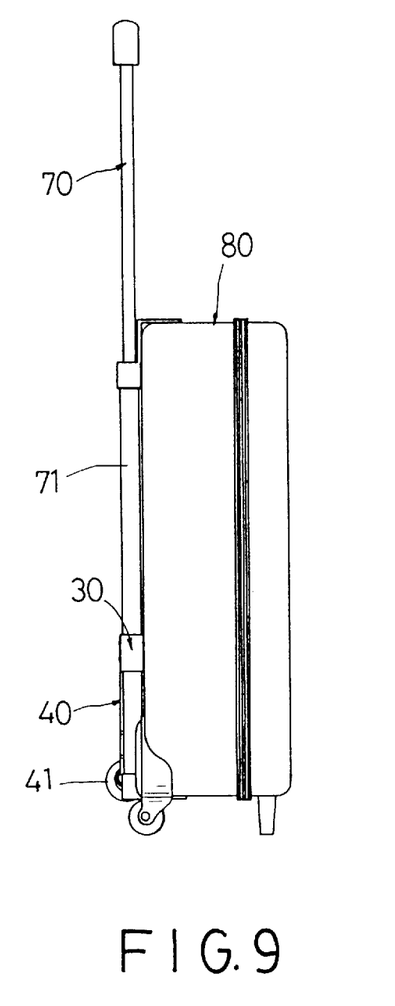
FIG. 9 is a side view illustrating the supporting device in a folded position.
Figure 10:
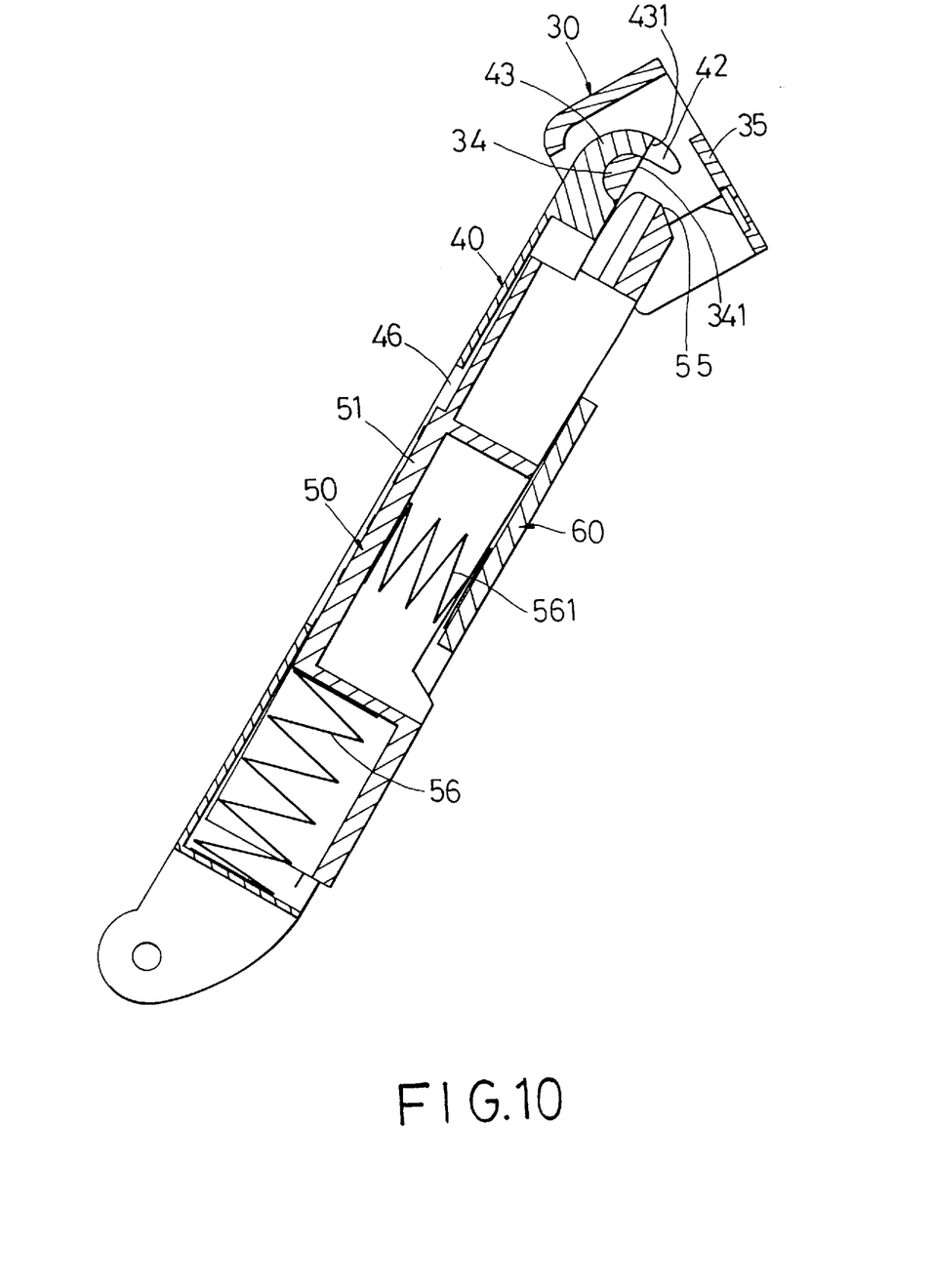
FIG. 10 is a sectional view illustrating the locking member when released from the stop member.
Figure 11:
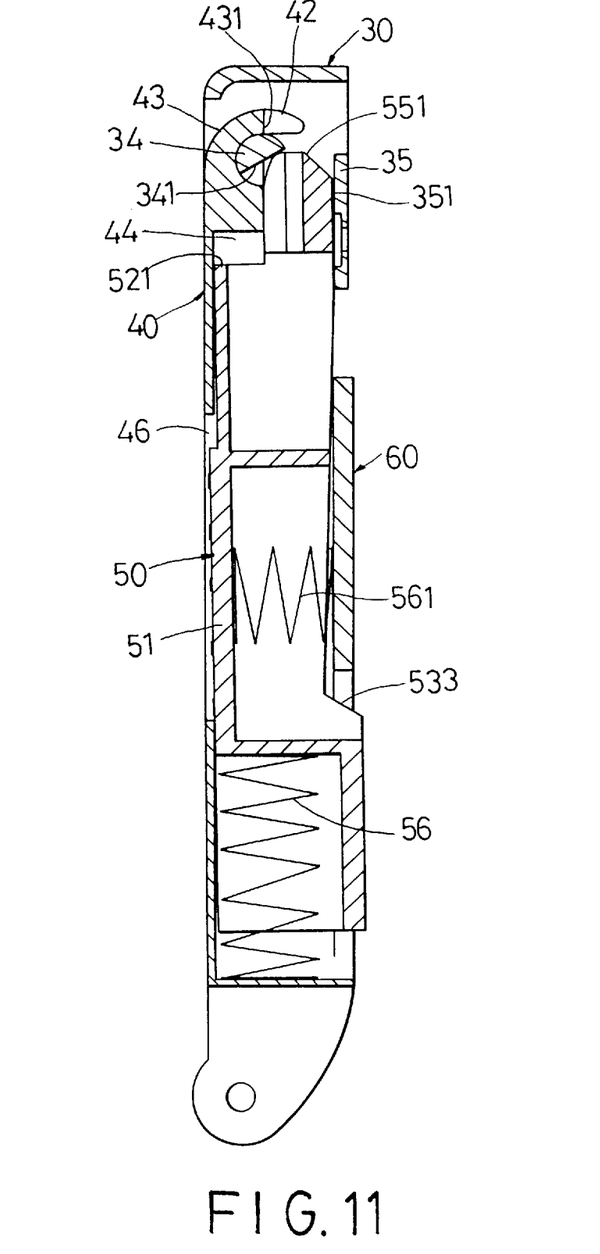
FIG. 11 is a sectional view illustrating the supporting device in the folded position.

Referring to FIGS. 9 and 10, when the suitcase is to be stored, the user can press inwardly and downwardly the button part 51 exposed from the button hole 46. As such, the button part 51 separates from the press button hole 46 and moves downward against the action of the springs 56, 561. Referring to FIG. 11, when the locking member 50 is moved downward, the top engaging end 55 is disengaged from the stop member 35 and the hook member 43 of the leg member 40. Therefore, the leg member 40 can be turned inward to be in a folded position. The second diametral planar face 431 becomes parallel to the abutment surface 351 of the stop member 35. The top engaging end 55 is pressed by the first diametral planar face 341, thus preventing the locking member 50 from moving upward and the button part 51 from moving into the press button hole 46.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A supporting device for a wheeled suitcase which has a suitcase body with a wall and a handle attached to said wall substantially in parallel therewith, comprising:

a) a positioning member (30) mounted on the wall of the suitcase body and extending in a direction transverse to said handle, said positioning member having a pivot member (34) which extends along said direction, and a stop member (35) provided adjacent to and spaced from said pivot member;

b) a leg member (40) having an upper end pivotally mounted to said pivot member for turning thereabout to move said leg member to an operative inclined position relative to said wall when said wall is tilted for forward movement of said suitcase body, or turned inward and toward said wall to be folded over said wall when said wall rests substantially vertically, said leg member having a bottom wheel (41) adapted to roll on the ground when said leg member is in said operative inclined position, and a receiving space (44) between said upper end and said bottom wheel; and c) a locking member (50) including means for being slidably received in said receiving space and extending in a direction from said bottom wheel to said upper end, said locking member having a top engaging end disposed below said pivot member, and first biasing means (56) for biasing said locking member so as to move said top engaging end toward said pivot member and to engage said stop member when said leg member is turned outward to said operative inclined position, thereby preventing said leg member from turning inward, said locking member being operable to move downward to disengage said top engaging end from said stop member and said upper end.

2. A supporting device as claimed in claim 1, wherein said positioning member has holes (31) which extend in a direction of said handle on two sides of said pivot member for holding said handle.

3. A supporting device as claimed in claim 1, wherein said pivot member has a semi-circular cross-section in a plane substantially perpendicular to said wall and an axially extending first diametral planar face (341), said first diametral planar face lying in a plane which forms an acute angle with said wall, said upper end of said leg member having a hook member (43) for pivotally engaging said pivot member, said hook member having a curved groove of semi-circular cross-section in a plane perpendicular to said wall to pivotally receive said pivot member, said hook member further having a longitudinally extending second diametral planar face (431) parallel to a plane extending in the direction of movement of said locking member, said second diametral planar face being grooved to form said curved groove.

4. A supporting device as claimed in claim 3, wherein said stop member has an abutment surface substantially parallel to said wall, said first diametral planar face being spaced from said abutment surface and forming an inclining angle relative to said abutment surface, said first and second diametral planar faces lying in a common plane when said leg member is in said operative inclining position, said second diametral planar face being parallel to said abutment surface when said leg member is folded over said wall.

5. A supporting device as claimed in claim 4, wherein said leg member has a base wall extending between said upper end and said bottom wheel at one side of said locking member, and a cover plate substantially parallel to said base wall at the other side of said locking member, said base wall having a press button hole (46) formed therein, said locking member further having an intermediate button part (51) below said top engaging end, and second biasing means (561) provided between said cover plate and said intermediate button part for biasing said intermediate button part to project into said press button hole.

6. A supporting device as claimed in claim 5, wherein said locking member further has a lower partition plate and an upper partition plate which divide said receiving space into upper, intermediate and lower compartments, said first biasing means including a spring (56) loaded in said lower compartment to push upward said lower partition plate, said cover plate having a lower edge above said lower partition plate, said locking member further having a shoulder formed between said lower edge and said lower partition plate, said lower edge limiting upward movement of said locking member by engaging said shoulder.

* * * * *